UNITED STATES PATENT OFFICE.

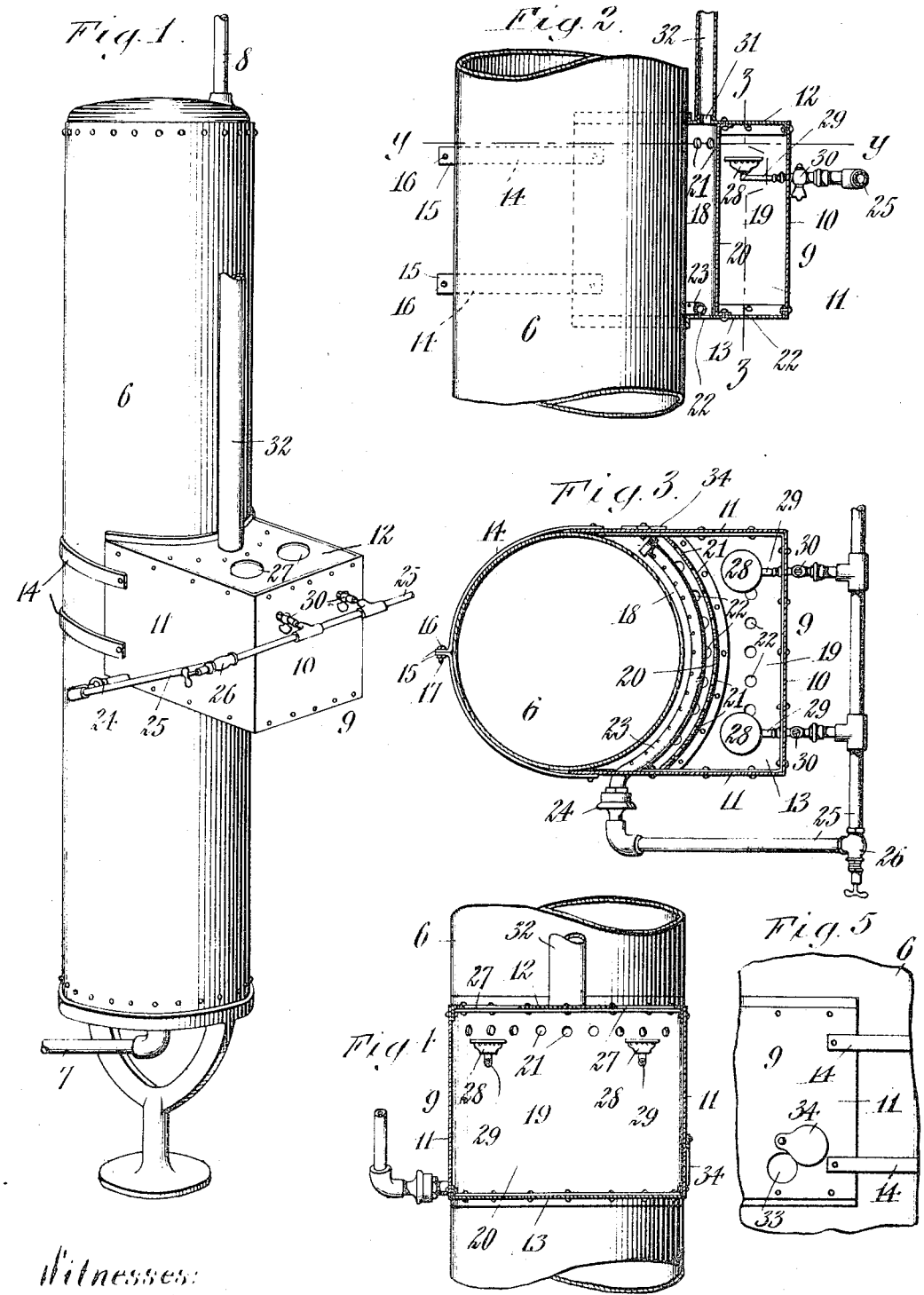

WILLIAM J. BOLAND, OF BUFFALO, NEW YORK.

WATER-HEATER.

1,050,911.

Specification of Letters Patent.   Patented Jan. 21, 1913.

Application filed May 1, 1911. Serial No. 624,281.

*To all whom it may concern:*

Be it known that I, WILLIAM J. BOLAND, a citizen of the United States, residing at Buffalo, in the county of Erie and State of New York, have invented new and useful Improvements in Water-Heaters, of which the following is a specification.

My invention relates to improvements in water heaters and more particularly to a heater adapted to be applied to the ordinary pressure boiler.

The primary object of my invention is the production of a heater adapted to be applied to the ordinary pressure boiler so as to heat the water contained therein.

Another object of my invention is the provision of a heater of this type which can be removed from or adjusted lengthwise on the pressure boiler and which is provided with a burner whose flame acts directly against said pressure boiler.

Still another object of my invention is the provision of a heater of this type having combined with it, means for cooking, broiling, toasting, or otherwise preparing articles of food for use.

Further objects are to construct a heater having two chambers, each provided with a burner and having an escape pipe for the smoke and fumes common to both chambers; to provide a heater having all but one of its sides closed and the upper and lower walls at their inner ends concaved to conform to the curvature of the boiler so that the latter serves to close the open side of the heater; and to otherwise improve on water heaters now in use.

By constructing a boiler with the above objects in view, I am enabled to heat the water while contained in the pressure boiler instead of heating the same at a point outside of the boiler, thus making it unnecessary to employ the large number of pipes now employed on water heaters used in connection with pressure boilers, as I dispense with the circulating pipe system owing to the fact that the water is heated in the boiler in quantity and only as required.

My invention consists in a heater applied to the exterior of a pressure boiler and having therein a burner whose flame is directed against the boiler to heat the water therein.

It also consists of a heater having a casing closed on all but one side and having its open side closed by the pressure boiler.

It further consists in a detachable heater adjustable lengthwise of the boiler; in the provision of a cooking section and a water heating section; and of a smoke escape flue common to both sections; and it still further consists in the construction, arrangement, and combination of parts to be hereinafter described and particularly pointed out in the subjoined claims.

In the drawings,—Figure 1 is a perspective view of a pressure boiler and a water heater constructed according to my invention and applied to said boiler. Fig. 2 is a side elevation of a portion of a pressure boiler having my improved water heater applied thereto and shown in central vertical section. Fig. 3 is a horizontal section taken on line *y—y*, Fig. 2. Fig. 4 is a transverse vertical section taken on line *z—z*, Fig. 2. Fig. 5 is a fragmentary side elevation showing a portion of the heater with its opening for permitting the lighting of the burner in the water heating section, and the adjacent portion of a boiler.

Referring now to the drawings in detail, in which similar numerals of reference refer to similar parts in the several figures, the reference numeral 6 designates the pressure boiler, which has a feed pipe 7 and a water outlet pipe 8, the latter leading the hot water to any suitable point for use.

The heater is designated by the numeral 9 and comprises a casing having an outer end wall 10, side walls 11, a top wall 12, and a bottom wall 13. The casing is preferably made in width so that its side walls embrace a portion of the boiler and its top and bottom walls are made concaved at their inner ends to conform to the curvature of the boiler so that a close fit is obtained between the boiler and heater and so that the boiler effectively closes the inner end of the heater. Segmental securing bands 14 are secured to the side walls of the heater and are continued from such points around the boiler until they meet, said bands being provided with outstanding lugs 15 at their meeting ends, through which are passed bolts 16 having nuts 17 threaded thereon and with said bolts serving to rigidly secure the heater to the boiler. The interior of the casing is divided into two sections or chambers 18, 19, by a wall 20 which is preferably curved so that the inner chamber is of segmental shape, and near the upper end of said dividing wall a series of escape openings 21 is provided for a purpose to presently appear. Air openings 22 are arranged in the bottom wall 13 of the casing, the same being arranged in two series, one series supplying air to the segmentally shaped inner chamber and the other to supply air to the outer chamber.

Arranged in the inner chamber between the boiler and the dividing wall 20 is a burner 23 lying in proximity to the surface of the boiler and extending through one of the side walls of the heater casing, it being provided outside of said casing with an air mixer 24 and connected by means of said air mixer with a supply pipe 25 having a valve 26 therein for shutting off or opening the supply of fuel—preferably gas—to said burner.

In the top wall 12 of the casing, one or more griddle openings 27 may be formed and beneath each opening and within the outer chamber or cooking section is a burner 28 having supply pipes 29 connected thereto and extending out through the outer wall of the casing and being connected to the supply pipe 25. The supply pipes 29 have valves 30 for controlling the flow of gas to the burners 28.

In the top wall of the casing above the segmentally shaped inner chamber or water heating section, is formed an opening 31 from which extends an upstanding flange having connected thereto an escape flue 32 for the escape of smoke or fumes of the gases, which flue may be connected to a chimney or be otherwise arranged for the proper disposal of the smoke and fumes. The smoke and fumes, if any, in the outer chamber pass through the openings 21 in the dividing wall 20 and enter the upper end of the inner chamber 18, from which they escape through the flue 32, and the smoke and fumes of the gas from the water heating burner 23 pass directly upward and escape through said flue. The air openings 22 in the bottom wall of the casing provide the necessary air for feeding the burners to obtain an effective flame; and the griddle openings in the top wall admit of cooking in a manner similar to ordinary gas cooking stoves.

The burners 28 in the outer chamber may be lighted through the griddle openings and for the purpose of rendering the water heating burner in the inner casing accessible to permit of easily lighting the same, an opening 33 is provided in one of the side walls of the casing which may be closed by a pivoted lid 34, as clearly shown in Fig. 5.

I have herein shown my invention in what I now consider a very practicable form; but it is clear that changes in shape, construction, and minor details may be resorted to without departing from the principle involved or sacrificing any of the advantages thereof.

Having thus described my invention, what I claim is,—

1. The combination with a boiler, of a casing removably applied to the exterior of said boiler and divided into two sections, one a cooking section having a burner and the other a water heating section between said cooking section and the boiler having a burner in operative arrangement to said boiler and an escape flue.

2. The combination with a boiler, of a heater removably applied to the exterior of said boiler and comprising a casing open at one side and being arranged with its open side against the boiler and closed thereby, a wall dividing said casing into an inner chamber and an outer chamber, a burner in said inner chamber, a burner in said outer chamber, and means for the escape of smoke and fumes from both chambers through a single escape.

3. The combination with a boiler, of a heater applied to the interior of said boiler and comprising a casing having a top wall, a bottom wall, an outer end wall, and side walls and having its top and bottom walls curved to fit the exterior surface of the boiler so that said boiler closes the inner end of said casing, a dividing wall between said boiler and said end wall having an opening near its upper end, an escape flue in said top wall, a burner between said boiler and said dividing wall arranged to direct a flame against the boiler, and a burner between said dividing wall and said end wall and arranged for cooking food supported by said top wall.

4. The combination with a boiler, of a heater removably applied to the exterior of said boiler comprising a casing having side walls, a top wall provided with a griddle opening and an escape opening for smoke and fumes, a bottom wall provided with air inlets, and an end wall and having the inner ends of said top and bottom walls curved to fit against the boiler, said boiler serving to close the inner end of said casing, a wall arranged between said outer end wall and said boiler to divide the casing into an inner chamber and an outer chamber and having openings near its upper end, a curved burner in said inner chamber in proximity to said boiler, a burner in said outer chamber beneath said griddle opening, and a supply pipe connected with said burners.

In testimony whereof, I have affixed my signature in the presence of two subscribing witnesses.

WILLIAM J. BOLAND.

Witnesses:
 EMIL NEUHART,
 ELLA C. PLUECKHAHN.